Figure 1:
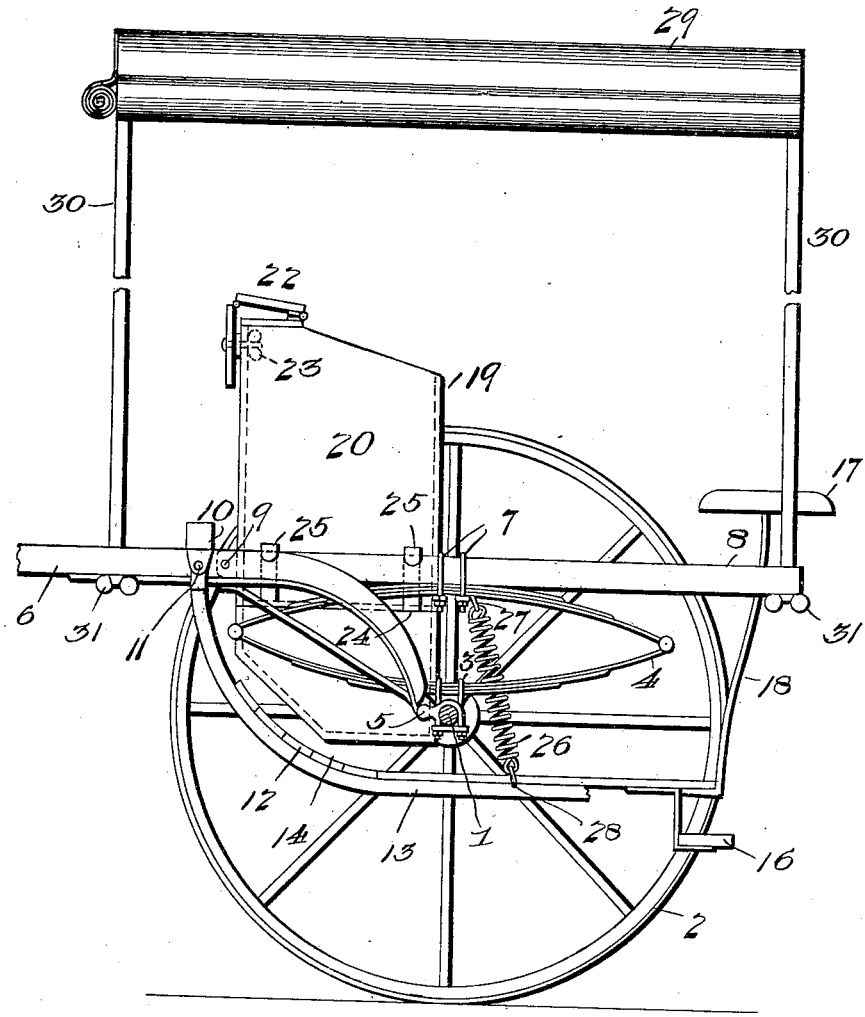

V. C. KOONS.
MAIL CART.
APPLICATION FILED JUNE 21, 1906.

923,278.

Patented June 1, 1909.
2 SHEETS—SHEET 1.

V. C. KOONS.
MAIL CART.
APPLICATION FILED JUNE 21, 1906.
923,278.
Patented June 1, 1909.
2 SHEETS—SHEET 2.
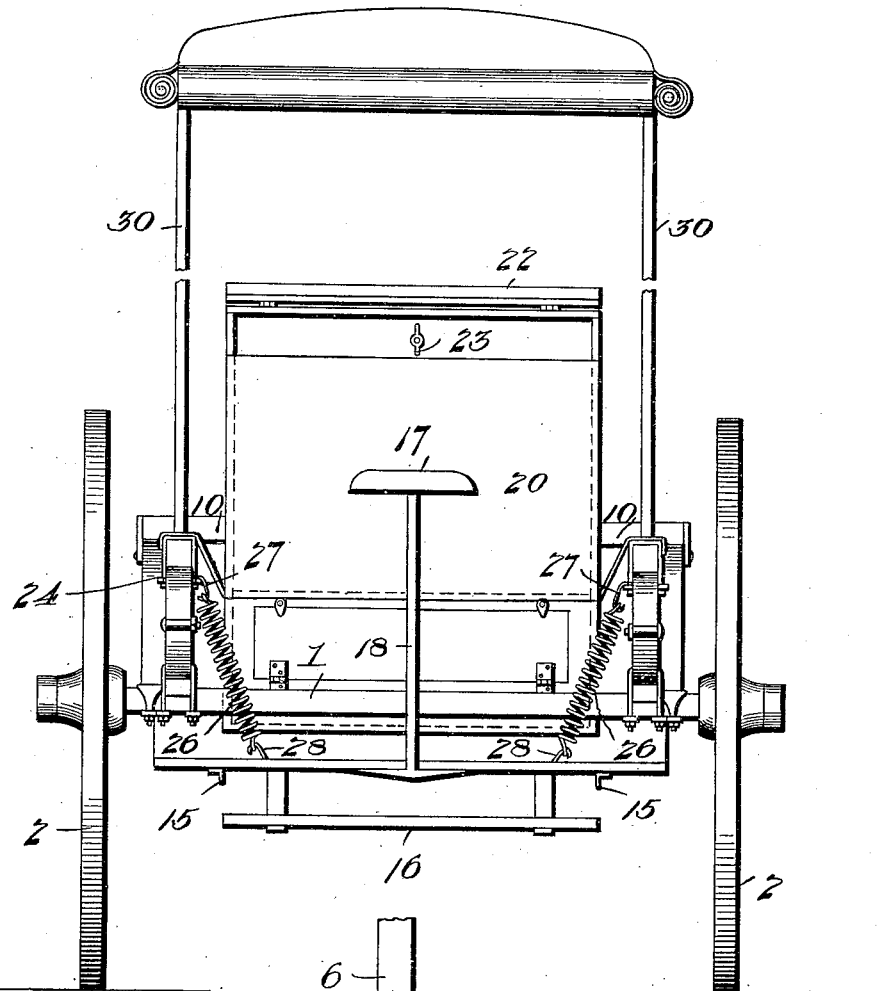
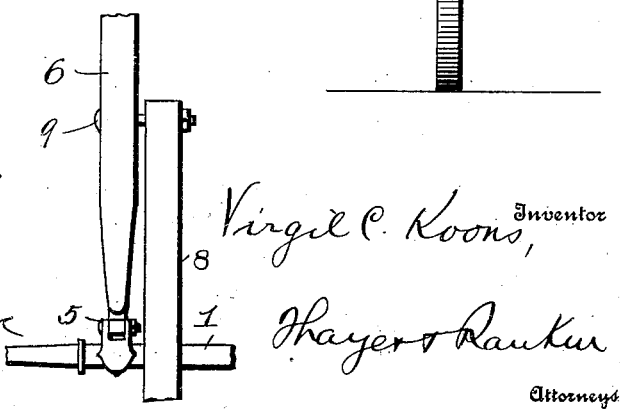

UNITED STATES PATENT OFFICE.

VIRGIL C. KOONS, OF COLORADO SPRINGS, COLORADO, ASSIGNOR TO CONTINENTAL MANUFACTURING COMPANY, OF COLORADO SPRINGS, COLORADO, A CORPORATION OF COLORADO.

MAIL-CART.

No. 923,278.      Specification of Letters Patent.      Patented June 1, 1909.

Application filed June 21, 1906. Serial No. 322,705.

*To all whom it may concern:*

Be it known that I, VIRGIL C. KOONS, a citizen of the United States, residing at Colorado Springs, in the county of El Paso and State of Colorado, have invented certain new and useful Improvements in Mail-Carts; and I do hereby declare the following to be a full, clear, and exact description of the invention, such as will enable others skilled in the art to which it appertains to make and use the same.

My invention relates generally to that class of vehicles used for transporting substantially small objects such as mail and express matter, and the embodiment of my invention described in this specification and illustrated in the accompanying drawings is confined particularly to what may be termed a mail cart or vehicle for transporting mail or parcels from place to place.

Similar numerals of reference refer to corresponding parts on the drawings in which—

Figure 1 is a side elevation, partly in section, of the vehicle; Fig. 2 a rear elevation of the same and Fig. 3 a detail illustrating the method of attaching the cross bar.

In the drawings 1 is a main axle carrying at its end wheels 2. At each outer end of the main axle 1 straps 3 support elliptical side springs 4. To the main axle 1 at each end are straps 5 attaching to the axle a pair of thills 6. Straps 7 secure the side springs 4 to the side bars 8 on each side of the vehicle, the side bars being pivoted at their inner ends to the thills 6 by means of bolts 9. A cross bar 10 extends between and is attached to the thills 6. Hinged or pivoted to the cross bar 10 at 11 is a platform 12. The platform 12 has curved supports 13 which may be of iron or other suitable material and these supports carry platform boards 14 which may be strengthened by angle irons 15 (Fig. 2). The platform 12 is provided with a suitable step 16 and a seat for the driver 17, the seat being attached to the platform 12 by any appropriate means, as for example, an iron support 18. A receptacle or mail box 19 is secured to the side bars and has two parts 20 and 21 secured together. The upper part 20 is particularly adapted for the reception of mail matter or parcels, while the lower part 21 is adapted to the storage of such accessories as storm clothing, horse feed, etc. The part 20 is provided with a hinged cover 22 which is adapted to be fastened in an open position by means of a thumb screw 23. Passing around the bottom of the portion 20 and securely bolted thereto are braces 24 which are provided with extensions 25, adapted to hook over the side bars 8 on each side of the vehicle, thus forming a solid foundation for the mail box as well as a firm brace for the entire box structure. It is also evident that by this method of supporting the box 19 it is firmly held in place and yet readily removable from the vehicle.

The platform 12 pivotally secured at the front of the cross bar 10 extends beneath the receptacle or box 19 to the rear and is supported by coil springs 26 which are secured at 27 to the top of the elliptical side springs 4 and at 28 to the platform 12. It will be observed that the box or receptacle is thus suspended in front of the axle while the curved platform extends to the rear of the axle and is supported at a nearly central point but somewhat to the rear of the axle.

The vehicle may be provided with a suitable top as shown, for example, at 29, the top being supported by uprights 30, fastened, for example, by thumb nuts 31 to the frame of the vehicle.

It will be seen from the present description that my invention may be embodied in an exceedingly light, strong and compact structure and one moreover that is particularly adapted for transporting mail or parcels. Among some of the many advantages of this invention may be mentioned the ready accessibility of the various parts, and the firm although removable supporting means for the material to be carried. Furthermore, by reason of the fact that the cross bars 8 are hinged at one end to the thills and rest upon the side springs 4 and the coiled springs 26 are hinged to the platform 12 and also to the top of side springs 4, it is evident that both the material transported and the driver are substantially free from sudden jars or jolts owing to the action of the double sets of springs. It is further evident that by this manner of mounting the platform 12 no matter what the weight of the load in the box may be, it will not affect the position of the platform 12 upon which the carrier or driver stands, which would be the case if box and platform were built together and hung on coiled springs as is usually the case. Furthermore, I achieve a distinct function by the manner of placing the coiled springs 26. At the point where the coiled springs are fastened to the side-springs there is but slight motion, and the same is true of the point where these coiled springs are fastened to the platform. Those points are the center from which the horse-motion is distributed. The side-springs, then, perform their usual function in yielding to obstructions and taking care of vertical shocks. The coiled springs, placed as they are, absorb the rocking motion which would otherwise be imparted by the movement of the horse to the side-springs and the platform. In other words, I have placed these springs so that they act as cushions for the rocking horse-motion and absorb that motion.

Having now described my invention what I desire to claim and to secure by Letters Patent of the United States is as follows:

1. In a vehicle, the combination with a cross-bar, side-springs and thills, of side-bars pivoted to the thills and borne by the side-springs, a receptacle carried by the side-bars, and a platform suspended from the cross-bar and the side-springs.

2. In a vehicle, the combination with side-bars, a cross-bar and side-springs, of a receptacle removably secured to the side-bars and a platform beneath the receptacle and swung from the cross-bar and the side-springs.

3. In a vehicle the combination with side-bars, a cross-bar and side-springs, of a receptacle secured substantially at its middle to the side-bars, a curved platform pivoted to the cross-bar at the front extending beneath the receptacle, and spring-suspended at the rear.

4. In a vehicle, the combination with side-springs, a cross-bar, and side-bars, of a receptacle carried by the side bars in front of the axle, and a platform or body extending beneath the receptacle and to the rear and suspended from a nearly central point by springs.

5. In a vehicle provided with an axle, side springs, thills and a cross bar connecting the thills, the combination of a platform hinged at its forward end to the cross bar, side bars attached to the thills and side springs, a receptacle supported by the side-bars and resilient supports for the rear end of the platform.

6. In a vehicle provided with an axle, side springs, thills and a cross bar connecting the thills the combination of a platform hinged at its forward end to the cross bar, side bars attached to the thills and side springs, a receptacle supported by the side-bars and resilient supports for the rear end of the platform, the supports being connected to the platform and also to the side springs.

7. In a vehicle provided with thills, an axle, and side springs supported on the axle the combination of side bars hinged to the thills and supported on the side springs a receptacle supported by the side bars, a platform hinged at its forward end to the vehicle and springs connecting the platform with the tops of the side springs.

In testimony whereof I affix my signature, in presence of two witnesses.

VIRGIL C. KOONS.

Witnesses:
 WALTER F. ROGERS,
 DORINDA E. ROGERS.